(12) United States Patent
Yuasa et al.

(10) Patent No.: US 8,974,971 B2
(45) Date of Patent: Mar. 10, 2015

(54) POSITIVE ELECTRODE FOR RECHARGEABLE LITHIUM ION BATTERY, RECHARGEABLE LITHIUM ION BATTERY, AND BATTERY MODULE

(75) Inventors: Toyotaka Yuasa, Hitachi (JP); Mitsuru Kobayashi, Hitachiota (JP); Sai Ogawa, Naka-gun (JP); Masanari Oda, Hitachi (JP); Kan Kitagawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 246 days.

(21) Appl. No.: 13/561,870

(22) Filed: Jul. 30, 2012

(65) Prior Publication Data
US 2013/0071722 A1 Mar. 21, 2013

(30) Foreign Application Priority Data
Sep. 20, 2011 (JP) ................. 2011-204040

(51) Int. Cl.
*H01M 4/64* (2006.01)
*H01M 4/40* (2006.01)
*H01M 4/505* (2010.01)
*H01M 2/24* (2006.01)

(52) U.S. Cl.
CPC ................ *H01M 4/64* (2013.01); *Y02E 60/122* (2013.01)
USPC ........... 429/234; 429/158; 429/221; 429/224; 429/231.95; 429/231.8

(58) Field of Classification Search
USPC ......... 429/211, 158, 217, 340, 222, 221, 234, 429/231.95, 231.8, 224
See application file for complete search history.

(56) References Cited

U.S. PATENT DOCUMENTS

| | | | |
|---|---|---|---|
| 2004/0128813 A1* | 7/2004 | Murakami et al. | 29/25.03 |
| 2007/0026317 A1* | 2/2007 | Mitchell et al. | 429/233 |
| 2008/0241689 A1* | 10/2008 | Takami et al. | 429/220 |
| 2009/0305135 A1* | 12/2009 | Shi et al. | 429/217 |
| 2010/0092872 A1* | 4/2010 | Abe et al. | 429/340 |

FOREIGN PATENT DOCUMENTS

| | | | | |
|---|---|---|---|---|
| JP | 2000113892 A | * | 4/2000 | H01M 4/66 |
| JP | 2000340236 A | * | 12/2000 | H01M 4/80 |
| JP | 2010-212167 A | | 9/2010 | |

OTHER PUBLICATIONS

Machine Translation of: JP 2010/212167 A, Kato et al., Sep. 24, 2010.*

* cited by examiner

*Primary Examiner* — Kenneth Douyette
(74) *Attorney, Agent, or Firm* — Volpe and Koenig, P.C.

(57) ABSTRACT

A positive electrode for a rechargeable lithium ion battery includes a mixture layer including a positive-electrode active material, a conducting agent, and a binder and a collector having the mixture layer formed on the surface thereof. The positive-electrode active material is a composite oxide having an olivine structure expressed by a formula $Li_aM_xPO_4$ (where M represents a transition metal including at least one of Fe and Mn and a and x satisfy $0<a\leq1.1$ and $0.9\leq x\leq1.1$). The conducting agent includes fibrous carbon. A carbon coating layer is formed on the surface of the collector. A part of the positive-electrode active material and a part of the fibrous carbon enter pits formed in the carbon coating layer.

9 Claims, 2 Drawing Sheets

POSITIVE ELECTRODE FOR RECHARGEABLE LITHIUM ION BATTERY, RECHARGEABLE LITHIUM ION BATTERY, AND BATTERY MODULE

BACKGROUND OF THE INVENTION

1. Field of the Invention

The present invention relates to a positive electrode of a rechargeable lithium ion battery using a non-aqueous electrolytic solution and a rechargeable lithium ion battery and a battery module having the positive electrode, and more particularly, to an improvement in structure of a positive electrode.

2. Background Art

For the purpose of further improvement in energy efficiency of vehicles, there is a need for development of a plug-in hybrid electric vehicle (hereinafter, abbreviated as "PHEV"). Since a PHEV uses energy stored with a household power source to travel, the battery used in the PHEV requires a high capacity necessary for an electric vehicle having a long cruising range and high output power for a short time necessary for a hybrid vehicle.

In this way, an increase in capacity and an increase in output power are important as battery characteristics necessary for the PHEV. Accordingly, since a rechargeable lithium ion battery for a PHEV is a large-size high-capacity battery, the ensuring of safety is important. In an in-vehicle large-size high-capacity rechargeable lithium ion battery, there is a need for improvement in volume energy density and weight energy density for the purpose of a decrease in size and weight of a battery. Since the large-size high-capacity rechargeable lithium ion battery stores great energy, a positive-electrode active material having high thermal stability and high safety is required.

A positive-electrode active material ($LiMPO_4$ where M is a transition metal including at least one of Fe and Mn and which is hereinafter referred to as an "olivine positive-electrode material") having an olivine structure including Fe or Mn as a transition metal has attracted attention as a positive-electrode material satisfying the above-mentioned requirements. In the olivine positive-electrode material, since the bond of oxygen and phosphorous in the crystal structure is strong and oxygen is not easily discharged from the crystal structure at the time of overcharging, it has high safety. However, it is reported that the olivine positive-electrode material has low electron conductivity and a low diffusion coefficient of lithium ions into the positive-electrode material.

In the olivine positive-electrode material, the diffusion properties of lithium ions are improved by enhancing the specific surface area of the material for the purpose of practical use, and conductivity is given thereto by coating the material with carbon (carbon coating). When a material is coated with carbon, it is possible to give conductivity to the material and to suppress the crystal growth, thereby contributing to an increase in specific surface area due to a particle diameter reduction of reducing primary particles to a submicrometer size.

From the viewpoint of improvement in volume energy density, the olivine positive-electrode material has the following problems. For example, since the true density of olivine Fe is 3.6 g/cc ($g/cm^3$), the volume of the olivine positive-electrode material increases to acquire the same volume energy density as the positive-electrode material employing a layered $LiNiMnCoO_2$ system with a true density of 5.1 g/cc. Accordingly, the olivine positive-electrode material is a material of which the volume density it is difficult to increase. In addition, the density of the olivine positive-electrode material further decreases when it is coated with carbon. Since the olivine positive-electrode material has a large specific surface area as described above, the amount of binder per unit surface area necessary for forming an electrode increases. However, in order to guarantee the battery capacity, it is preferable to reduce the amount of binder in the electrode composition.

In general, in order to enhance the volume energy density in a high-capacity battery, it is necessary to increase the content of a positive-electrode active material in the positive electrode and to increase the thickness of a mixture layer including a positive-electrode active material, a conducting agent, and a binder. In manufacturing an olivine positive electrode, a slurry in which an olivine positive-electrode material, a conducting agent, and a binder are dispersed in a solvent is applied onto an aluminum collector and the resultant is dried to obtain a positive electrode. In an electrode with a thick mixture layer, a phenomenon in which a binder resin migrates to the surface layer with the evaporation of the solvent in the drying step markedly occurs. Accordingly, the amount of binder in the interface between the aluminum collector and the mixture layer decreases. When the amount of binder decreases, the mixture layer is detached from the interface by the consolidation due to an electrode pressing process or a rolling process. In this way, the consolidation of an electrode for improvement in volume energy density is indispensable for the olivine positive electrode, but it is necessary to suppress the detachment of the mixture layer from the interface between the aluminum collector and the mixture layer.

JP-A-2010-212167 discloses a method of forming a carbon coating layer with a surface roughness of 0.5 to 1.0 μm on a collector and forming a mixture layer thereon so as to suppress detachment of the mixture layer from the interface between the collector and the mixture layer. It also discloses that the load characteristics can be improved by employing this configuration.

SUMMARY OF THE INVENTION

As described in JP-A-2010-212167, it is thought that the detachment of the mixture layer can be suppressed to a certain extent by employing an aluminum collector having the carbon coating layer formed thereon. An improvement in the load characteristics can be expected to a certain extent by improving the electron conductivity in the interface between the collector and the mixture layer through the use of the carbon coating layer. However, when the thickness increases by increasing the amount of the carbon coating layer formed on the positive electrode, there is a problem in that microcracks in the thickness direction of the positive electrode are caused or the electron conductivity is lowered.

An object of the invention is to provide a positive electrode for a rechargeable lithium ion battery which can improve the capacity per volume of the positive electrode and improve the load characteristics through improvement in electron conductivity of the positive electrode, and a rechargeable lithium ion battery and a battery module employing the positive electrode.

A positive electrode for a rechargeable lithium ion battery according to the invention has the following characteristics. That is, there is provided a positive electrode for a rechargeable lithium ion battery including: a mixture layer that includes a positive-electrode active material, a conducting agent, and a binder; and a collector that has a carbon coating layer formed thereon and has the mixture layer formed on the surface thereof, wherein the positive-electrode active material is a composite oxide having an olivine structure expressed by a formula $Li_aM_xPO_4$ (where M represents a transition metal including at least one of Fe and Mn and a and x satisfy $0<a\leq1.1$ and $0.9\leq x\leq1.1$), wherein the conducting agent includes fibrous carbon, wherein pits are formed on the surface of the carbon coating collector, and wherein a part of the positive-electrode active material and a part of the fibrous carbon enter the pits.

According to the invention, it is possible to provide a positive electrode for a rechargeable lithium ion battery which can improve the capacity per volume of the positive electrode and which has low resistance, and a rechargeable lithium ion battery and a battery module employing the positive electrode.

DETAILED DESCRIPTION OF THE INVENTION

Figure 1A:
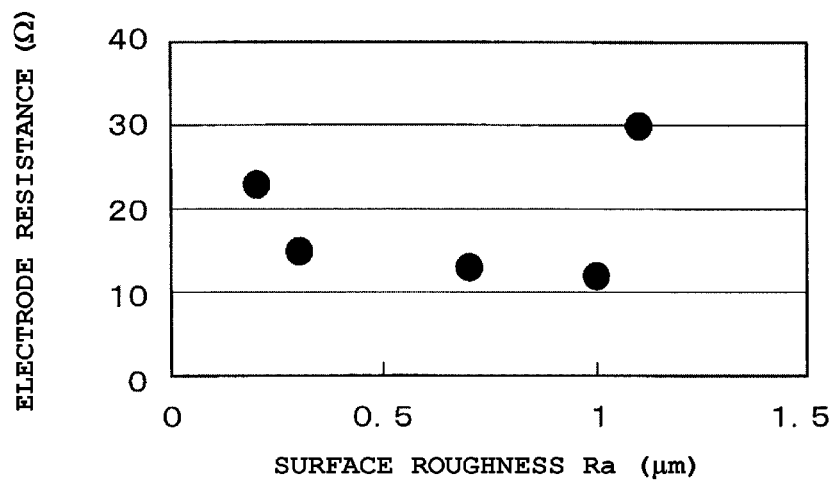
FIG. 1 is a diagram illustrating the relationship among the surface roughness Ra of a carbon coating layer on a collector of an aluminum substrate, an electrode volume energy density, and electrode resistance.

The inventors performed intensive studies in order to solve the above-mentioned problems and found that it is possible to enhance the content of a positive-electrode active material in a positive electrode and to enhance the density of the positive electrode to enhance the energy density per unit volume (volume energy density), by studying materials and compositions of a positive-electrode active material, a conducting agent, and a binder constituting a positive-electrode mixture and formation of a carbon coating layer on the surface of a collector used as a substrate of the mixture. The capacity per volume of an electrode is expressed as a volume energy density of the electrode. It was also found that it is possible to reduce the electrode resistance by improving the electron conductivity of the positive electrode.

The positive electrode for a rechargeable lithium ion battery according to the invention includes a mixture layer including a positive-electrode active material, a conducting agent, and a binder and a collector having a carbon coating layer formed thereon, and the positive-electrode active material is a composite oxide having an olivine structure expressed by a formula $Li_aM_xPO_4$ (where M represents a transition metal including at least one of Fe and Mn and a and x satisfy $0<a\leq1.1$ and $0.9\leq x\leq1.1$).

The positive-electrode active material (olivine positive-electrode material) has a specific surface area in the range of $10\ m^2/g$ to $30\ m^2/g$ ($10\sim30\ m^2/g$), an average primary particle diameter in the range of 0.05 μm to 0.3 μm (0.05~0.3 μm), and an average secondary particle diameter in the range of 0.2 μm to 1 μm (0.2~1 μm). In the specification, the average primary particle diameter and the average secondary particle diameter are also simply referred to as a primary particle diameter and a secondary particle diameter, respectively. The conducting agent is a mixture of carbon black and fibrous carbon. The collector includes an aluminum substrate having a carbon coating layer, the surface roughness of which is defined, formed on the surface thereof.

In the positive electrode for a rechargeable lithium ion battery according to the invention, the content of the positive-electrode active material in the mixture layer is preferably in the range of 90% to 93% in terms of weight percentage, but is not limited to this range. The weight percentage of the fibrous carbon in the conducting agent is preferably in the range of equal to or greater than 20% and less than 60%, but is not limited to this range. The electrode density is preferably in the range of 2.0 g/cc (g/cm$^3$) to 2.3 g/cc (g/cm$^3$), but is not limited to this range.

An increase in thickness of the positive electrode, an increase in content of the positive-electrode active material in the positive electrode, and an increase in density of the positive electrode are required for an increase in capacity of a battery. In order to achieve this positive electrode specification using an olivine positive-electrode material including micro primary particles, a positive electrode configuration having a high binding property is necessary. The improvement of the binding property based on the study of the binder can also be considered, but the binding property of the interface between the collector having a carbon coating layer formed thereon and the mixture layer is noted in the invention. In general, trials have been performed in order to form a carbon coating layer on an aluminum collector to improve the binding property of the interface between the collector and the mixture layer. In the invention, the improvement of the binding property of the olivine positive-electrode material including micro primary particles was studied from the following point of view. That is, by forming pits on the surface of the carbon coating layer formed on the collector of an aluminum substrate, the relationship between the pit diameter and the average secondary particle diameter of the olivine positive-electrode material and the effect of the fibrous carbon dispersed in the positive electrode and used as a conducting agent have been studied.

A "pit" is a hole formed in the surface of the carbon coating layer formed on the collector of an aluminum substrate, and the shape of the opening and the shape in the depth direction are not particularly limited. A "pit diameter" is the maximum length (maximum width) of the opening of the pit. In this specification, an average pit diameter, which is the average of the pit diameters of the pits, is also simply referred to as a pit diameter.

By causing a part of the positive-electrode active material (olivine positive-electrode material) and a part of the fibrous carbon to enter the pits, it is possible to improve the binding property of the interface between the collector having the carbon coating layer and the mixture layer by an anchor effect. The olivine positive-electrode entering the pits may be any of primary particles and secondary particles. Here, the relationship between the pit diameter and the particle diameter of the olivine positive-electrode material is determined depending on the secondary particles having a larger particle diameter.

The relationship between the pit diameter and the average secondary particle diameter of the olivine positive-electrode material will be described below. In general, by changing the type of carbon and the coating process used to form the collector having the carbon coating layer formed thereon, pits with a pit diameter of several μm and a depth of several μm can be formed on the surface of the carbon coating layer. The secondary particles of the olivine positive-electrode material enter the pits to cause an anchor effect, and thus the binding property of the interface between the collector and the mixture layer is improved. Here, the binding property varies depending on the relative relationship between the pit diameter and the secondary particle diameter. For example, when the pit diameter and the secondary particle diameter are almost equal to each other, it is difficult to cause the secondary particles of the olivine positive-electrode material to enter the pits. On the other hand, when the secondary particle diameter of the olivine positive-electrode material is excessively smaller than the pit diameter, the anchor effect is reduced.

Accordingly, in the invention, the secondary particle diameter of the olivine positive-electrode material suitable for the pit diameter of the pits on the surface of the carbon coating layer formed on the aluminum collector is defined as follows. That is, the average secondary particle diameter of the olivine positive-electrode material is in the range of 0.2 µm to 1 µm and an average secondary particle diameter/average pit diameter which is a ratio to the average pit diameter is in the range of 0.1 to 0.5. By this definition, it is possible to improve the binding property of the interface between the carbon coating layer formed on the collector and the mixture layer through the use of an appropriate amount of olivine positive-electrode material entering the pits and to enhance the density of the positive electrode.

The conducting agent used for the positive electrode will be described below for explanation of the effect of the fibrous carbon dispersed in the positive electrode. In the positive electrode, the conducting agent is dispersed in the positive electrode to guarantee the electron conductivity. Examples of the conducting agent include acetylene black of a micro particle shape and fibrous carbon.

Figure 3:
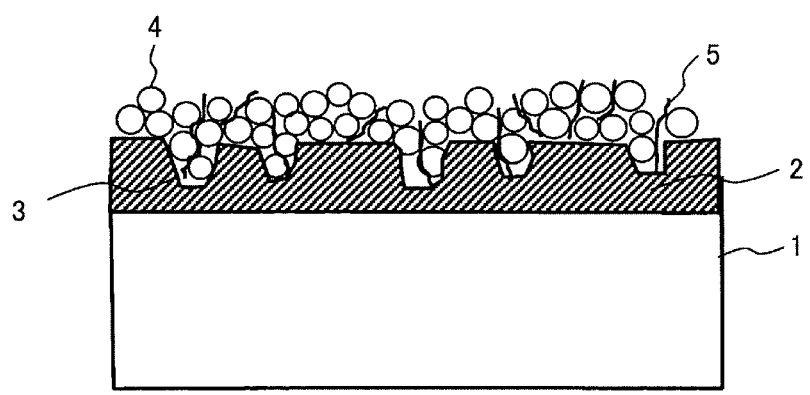
FIG. 3 is a cross-sectional view of a positive electrode for a rechargeable lithium ion battery.

The effect of the fibrous carbon dispersed in the positive electrode will be described below with reference to FIG. 3. FIG. 3 is a cross-sectional view of the positive electrode for a rechargeable lithium ion battery according to the invention and shows the pits 3 formed on the surface of the carbon coating layer 2 formed on the collector 1 of an aluminum substrate, secondary particles 4 of the olivine positive-electrode material, and the fibrous carbon 5. In FIG. 3, only secondary particles out of particles (the primary particles and the secondary particles) of the olivine positive-electrode material are representatively shown. The same description is true of the primary particles.

The secondary particles 4 of the olivine positive-electrode material can enter the pits 3. Here, when the fibrous carbon 5 used as the conducting agent is dispersed in a mixture slurry, the fibrous carbon 5 also enters the pits 3 and the fibrous carbon 5 is distributed in the thickness direction of the mixture layer, thereby improving the binding property of the mixture. However, when the amount of the fibrous carbon 5 included in the conducting agent is excessively great, the fibrous carbon 5 and the olivine positive-electrode material form aggregates and the fibrous carbon 5 can not enter the pits 3. When the amount of the fibrous carbon 5 is excessively small, the anchor effect of the fibrous carbon 5 is reduced. Accordingly, it is necessary to define the content of the fibrous carbon 5 included in the overall conducting agent. The content of the fibrous carbon 5 in the overall conducting agent was defined as being equal to or greater than 20% and less than 60% in terms of weight percentage.

Specific examples of the fibrous carbon used therein include vapor-grown carbon fiber, carbon nano tube (CNT), and carbon nano fiber (CNF). The fibrous carbon has superior characteristics, but is difficult to disperse in the mixture slurry, and may form aggregates in the slurry. Since the aggregates in the slurry make it difficult to keep the thickness of the mixture layer constant in the electrode applying step, a mixture composition in which aggregates are not formed is preferable.

The effect of the acetylene black will be described below. The acetylene black has a micro particle shape with a particle diameter of several tens of nm and is superior in dispersibility in the slurry. Accordingly, the acetylene black is advantageous for guaranteeing the electron conductivity in the positive electrode while suppressing the formation of aggregates.

In consideration of the characteristics of the fibrous carbon and the acetylene black, the content of the fibrous carbon in the overall conducting agent was defined to be equal to or greater than 20% and less than 60% in terms of weight percentage. Here, when the content of the fibrous carbon is less than 20%, the above-mentioned effect is reduced. When the content of the fibrous carbon is equal to or greater than 60%, many aggregates are present in the slurry and it is thus difficult to form the positive electrode.

By employing the above-mentioned electrode configuration, it is possible to obtain a high-density positive electrode in which the content of the positive-electrode active material (olivine positive-electrode material) in the mixture layer is in the range of 90% to 93% in terms of weight percentage and the electrode density is in the range of 2.0 to 2.3 g/cc, that is, a positive electrode with a high volume energy density and a high-rate discharging property.

In the invention, as described above, the configuration of the positive electrode including the olivine positive-electrode material is defined to provide a large-size high-capacity rechargeable lithium ion battery with high safety.

The positive electrode for a rechargeable lithium ion battery, the rechargeable lithium ion battery, and the battery module according to the invention have the following characteristics.

(1) A positive electrode for a rechargeable lithium ion battery includes a mixture layer that includes a positive-electrode active material, a conducting agent, and a binder, the mixture layer is formed on a collector having the carbon coating layer formed on the surface thereof, the positive-electrode active material is a composite oxide having an olivine structure expressed by a formula $Li_aM_xPO_4$ (where M represents a transition metal including at least one of Fe and Mn and a and x satisfy $0<a\leq1.1$ and $0.9\leq x\leq1.1$), the conducting agent includes fibrous carbon, pits are formed on the surface of the carbon coating layer formed on the collector, and a part of the positive-electrode active material and a part of the fibrous carbon enter the pits.

(2) In the positive electrode for a rechargeable lithium ion battery according to (1), preferably, the positive-electrode active material has an average secondary particle diameter of 0.2 µm to 1 µm, and the average secondary particle diameter/average pit diameter ratio which is a ratio of the average secondary particle diameter and the average pit diameter of the pits is in the range of 0.1 to 0.5.

(3) In the positive electrode for a rechargeable lithium ion battery according to (1) or (2), the surface roughness of the carbon coating layer formed on the collector is preferably in the range of 0.3 µm to 1 µm.

(4) In the positive electrode for a rechargeable lithium ion battery according to any one of (1) to (3), the thickness of the carbon coating layer formed on the collector is preferably in the range of 0.8 µm to 1.4 µm and more preferably in the range of 1.0 µm to 1.4 µm.

(5) In the positive electrode for a rechargeable lithium ion battery according to any one of (1) to (4), the weight percentage of the fibrous carbon in the conducting agent is preferably equal to or greater than 20% and less than 60%.

(6) In the positive electrode for a rechargeable lithium ion battery according to any one of (1) to (5), the content of the positive-electrode active material in the mixture layer is preferably in the range of 90% to 93% in terms of the weight percentage.

(7) In the positive electrode for a rechargeable lithium ion battery according to any one of (1) to (6), the electrode density is preferably in the range of 2.0 g/cc to 2.3 g/cc.

(8) A rechargeable lithium ion battery which includes the positive electrode for a rechargeable lithium ion battery according to any one of (1) to (7).

(9) A battery module which has plural rechargeable lithium ion batteries according to (8) electrically connected.

Regarding the characteristics of (1) to (7), even when the characteristic of (1) is satisfied but the characteristics of (2) to (7) are not necessarily satisfied, the advantages of the invention can be achieved. For example, the surface roughness Ra of the collector is an average value over the overall collector and is not limited to the one-to-one correspondence with the average pit diameter described in (2). That is, when plural micro pits not satisfying the characteristic of (2) in addition to the pits satisfying the characteristic of (2) are present, the surface roughness Ra may be greater than 1 µm but the invention is effective even in this case. When the characteristics of (2) to (7) in addition to the characteristic of (1) are satisfied, the advantages of the invention are marked.

According to the invention, it is possible to provide a rechargeable lithium ion battery suitable for application to apparatuses such as a plug-in hybrid electric vehicle and an electric vehicle requiring high capacity and high safety.

An example of the positive electrode for a rechargeable lithium ion battery according to the invention will be described below in detail.

Material of Positive Electrode for Rechargeable Lithium Ion Battery

The positive electrode for a rechargeable lithium ion battery includes an olivine positive-electrode material (positive-electrode active material) having the following characteristics.

The specific surface area of the olivine positive-electrode material is 10 to 30 m$^2$/g. Here, when the specific surface area is less than 10 m$^2$/g, the reaction area of the positive-electrode material with the lithium ions is small and thus the electrode resistance increases. When the specific surface area is greater than 30 m$^2$/g, it is not possible to both achieve the increase in electrode density and the formation of a conductive network in the positive electrode. Particularly, since the olivine positive-electrode has low electron conductivity and a conductive network is not formed, the resistance increases, thereby not achieving desired discharging capacity.

The average primary particle diameter of the olivine positive-electrode material is in the range of 0.05 to 0.3 µm. When the average primary particle diameter is less than 0.05 µm, aggregates are formed at the time of application onto the electrode, thereby causing application failure. On the other hand, when the average primary particle diameter is greater than 0.3 µm, the reactivity of the positive-electrode active material itself is lowered, thereby not achieving desired discharging capacity.

The average secondary particle diameter of the olivine positive-electrode material is in the range of 0.2 to 1 µm. When the average secondary particle diameter is less than 0.2 µm, aggregates are formed at the time of application onto the electrode, thereby causing application failure. On the other hand, when the average secondary particle diameter is equal to or greater than 1.1 µm, it is difficult to obtain a high-density electrode for improvement in battery capacity.

The olivine positive-electrode material is a composite oxide having an olivine structure expressed by a formula $Li_aM_xPO_4$ (where M represents a transition metal including at least one of Fe and Mn and a and x satisfy $0<a\leq1.1$ and $0.9\leq x\leq1.1$). Here, the range of a representing the composition of Li is set to $0<a\leq1.1$ and the reason is as follows. The Li content in the olivine positive-electrode material constituting an electrode is in the range of $0<a\leq1.0$ depending on the state of charge of the positive electrode. Since the Li content in the olivine positive-electrode material may be excessive and Li may enter the M site, the range of a representing the composition of Li is set to $0<a\leq1.1$. The reason of setting the range of x representing the composition of the transition metal M to $0.9\leq x\leq1.1$ is that $0.9\leq x$ is set in consideration of the case where the content of Li is excessive and $x\leq1.1$ is set in consideration of the case where the content of the transition metal M is excessive.

The collector of an aluminum substrate having the carbon coating layer in the positive electrode for a rechargeable lithium ion battery has the following characteristics. That is, the collector is a collector of an aluminum substrate having pits with a pit diameter of 2 to 7 µm formed on the surface thereof and having a carbon coating layer with a surface roughness Ra of 0.3 to 1 µm based on JIS 2001. Since the relationship between the pit diameter on the surface of the collector and the secondary particle diameter of the positive-electrode material has been described above, the surface roughness Ra defined in the invention will be described below.

When Ra is less than 0.3 µm, the density of the pits formed on the surface of the carbon coating layer on the collector of an aluminum substrate is low and the anchor effect in the interface between the positive-electrode mixture layer and the carbon coating layer is small. Accordingly, it is not possible to achieve a positive electrode with a desired electrode density, thereby causing detachment through the consolidation process. On the other hand, when Ra is greater than 1 µm, places not having the carbon coating layer are locally formed due to an increase in density of the pits formed in the depth direction of the carbon coating layer on the collector of an aluminum substrate, thereby causing local detachment through the consolidation process. Accordingly, the surface roughness Ra of the carbon coating layer on the collector of an aluminum substrate is preferably in the range of 0.3 µm to 1 µm.

The process of forming the carbon coating layer on the collector of an aluminum substrate will be described below. Acetylene black with an average particle diameter of 35 to 50 nm and polyvinylidene fluoride binder were mixed at the same weight ratio and N-methyl-2-pyrrolidinone (hereinafter, abbreviated as "NMP") was added thereto for the purpose of adjustment of viscosity, whereby a slurry with a solid content ratio of 10% to 20% was prepared. This slurry was applied onto the collector of an aluminum substrate with a thickness of 30 µm to form a carbon coating layer. Here, the state of dispersion of acetylene black forming the carbon coating layer was changed by changing the solid content ratio of the slurry, thereby changing the surface roughness of the carbon coating layer.

Methods of manufacturing the olivine positive electrode, the battery, and the module will be schematically described below.

Method of Manufacturing Olivine Positive-Electrode Material

Iron oxalate dehydrate, ammonium dihydrogen phosphate, and lithium carbonate finely pulverized were mixed at a mole ratio of 2:2:1.0 and the mixture was calcined in the nitrogen atmosphere of 300° C., whereby a precursor was obtained. Thereafter, the precursor and polyvinyl alcohol were mixed and were heated in the nitrogen atmosphere of 700° C. for 8 hours, whereby an olivine positive-electrode material was obtained.

Method of Manufacturing Rechargeable Lithium Ion Battery

The rechargeable lithium ion battery may have any shape of a cylindrical shape, a laminated shape, a coin shape, and a card shape and the shape thereof is not particularly limited. In this specification, a method of manufacturing a cylindrical rechargeable lithium ion battery will be described as an example.

1) Method of Manufacturing Positive Electrode

A conducting agent such as acetylene black and fibrous carbon is added to the olivine positive-electrode material manufactured as described above and the resultant is mixed. The olivine positive-electrode material described in this specification has a large specific surface area and has a high absorption property of an organic solvent used to manufacture the electrode. Accordingly, the NMP is mixed into the positive-electrode active material in advance to cause the NMP to be absorbed in the positive-electrode active material and then the conducting agent is dispersed in the positive-electrode active material. Thereafter, a binder which is dissolved in a solvent such as an NBP is added to the mixture and the resultant is kneaded, whereby a positive-electrode slurry is obtained. Here, polyvinylidene fluoride (hereinafter, abbreviated as "PVDF") is used as the binder. This slurry is applied onto a collector of an aluminum substrate having a carbon coating layer and the resultant is then dried to manufacture a positive electrode plate.

2) Method of Manufacturing Negative Electrode

A conducting agent such as acetylene black and carbon fiber is added to an amorphous carbon material which is a negative-electrode active material and the resultant is mixed. A PVDF or a rubber binder (such as an SBR) dissolved in an NMP is added as a binder thereto and the resultant is kneaded, whereby a negative-electrode slurry is obtained. The slurry is applied onto a copper foil and is dried to manufacture a negative electrode plate.

3) Method of Manufacturing Battery

The positive electrode plate and the negative electrode plate are dried after a slurry is applied onto both surfaces of the electrodes. The resultants are densified through a rolling process and are cut in a desired shape to form electrodes. Lead pieces for supplying current to the electrodes are formed. A separator which is a porous insulating material is interposed between the positive electrode and the negative electrode, and the resultant is wound and is inserted into a battery can formed of stainless steel or aluminum. The lead pieces are connected to the battery can, a non-aqueous electrolytic solution is injected into the battery can, and the battery can is finally sealed, whereby a rechargeable lithium ion battery is obtained.

4) Formation of Battery Module

A battery module in which plural batteries are connected in series can be used as a use example of the rechargeable lithium ion battery. The battery module employing the rechargeable lithium ion battery according to the invention can be made to increase in capacity.

EXAMPLES

Examples of the invention will be specifically described below, but the examples do not limit the scope of the invention. In the following examples, an example where only Fe is used as the transition metal M constituting the olivine positive-electrode material and an example where Fe and Mn are used as the transition metal M will be described. Even when only Mn is used as the transition metal M, the same advantages as in the following examples can be achieved. This is because the olivine positive-electrode material employing only Mn as the transition metal M has the same crystal structure as the olivine positive-electrode material employing only Fe as the transition metal M or the olivine positive-electrode material employing Fe and Mn as the transition metal.

Example 1

Manufacturing of Olivine Positive-Electrode Material

Iron oxalate dehydrate, ammonium dihydrogen phosphate, and lithium carbonate which have been finely pulverized by the use of a ball mill for 3 hours were mixed at a mole ratio of 2:2:1.0 and the resultant was calcined in the nitrogen atmosphere of 300° C., whereby a precursor was obtained. Thereafter, the precursor and polyvinyl alcohol were mixed and were heated in the nitrogen atmosphere of 700° C. for 8 hours, whereby Olivine Positive-electrode Material 1 formed of carbon-coated $LiFePO_4$ was obtained. The amount of carbon coating was 1.9 wt %.

Method of Measuring Specific Surface Area

Olivine Positive-electrode Material 1 was dried at 120° C. in advance and was filled in a sample cell, and the resultant was dried in the nitrogen atmosphere of 300° C. for 30 minutes. The sample cell was mounted on a measuring section, a signal at the time of desorption due to $He/N_2$ mixed gas was counted, and the specific surface area was calculated through the use of a BET method. As a result, the specific surface area of secondary particles was 29 $m^2/g$.

Method of Measuring Secondary Particle Diameter

Olivine Positive-electrode Material 1 as a positive-electrode active material was dispersed in an aqueous solution of hexametaphosphoric acid and the average secondary particle diameter (D50) of the olivine positive-electrode material was calculated from the scattering of a laser beam. As a result, D50 was 0.7 µm. Since the average pit diameter of the carbon coating layer on an aluminum collector was measured to be 4 µm, the ratio of the average secondary particle diameter and the average pit diameter (average secondary particle diameter/average pit diameter) was 0.2.

Manufacturing of Positive Electrode

A positive electrode plate was manufactured in the following order using Olivine Positive-electrode Material 1. A solution in which a binder was dissolved in a solvent NMP, Olivine Positive-electrode Material 1, acetylene black which is a carbon-based conducting agent with an average particle diameter of 35 nm, and VGCF (registered trademark with a diameter of 150 nm and a fiber length of 10 to 20 µm) which is a vapor-grown carbon fiber were mixed to prepare a positive-electrode mixture slurry. At this time, two types of conducting agents were used at the same weight ratio. Accordingly, the weight percentage of fibrous carbon in the conducting agent was 50%.

Olivine Positive-electrode Material 1, the carbon-based conducting agent, and the binder were mixed at a ratio of 91:4:5 in terms of weight percentage. Accordingly, the content of the positive-electrode active material (olivine positive-electrode material) in the positive-electrode mixture layer was 91% in terms of weight percentage.

This slurry was uniformly applied onto an aluminum collector (with a thickness of 20 µm) on which a carbon layer with a surface roughness of Ra=0.7 µm and a thickness of 1 µm was formed, was dried at 100° C., and was pressed by the use of a press with about 1.5 ton/$cm^2$ to form a coating film with a thickness of about 60 µm, whereby a positive electrode plate with an electrode density of 2.2 g/cc (g/$cm^3$) was obtained. Then, in order to remove moisture from the positive electrode plate, a vacuum heating process was performed at 130° C. for 2 hours.

The surface roughness Ra of the aluminum sheet used herein was evaluated in accordance with the JIS 2001 through the use of a surface roughness measuring instrument (SURFTEST SV-2100, made by Mitsutoyo Corp.)

Evaluation of Positive Electrode

Holes of φ15 were punched in the positive electrode plate and a counter electrode and a reference electrode were formed of metal lithium to manufacture a cylindrical rechargeable lithium ion battery which is a test battery. At this time, a mixed solvent of ethyl carbonate and dimethyl carbonate was used as an electrolytic solution having 1.0 mol $LiPF_6$ as an electrolyte.

This test battery was initialized by repeating a charging and discharging operation at 0.3 C with an upper-limit voltage of 3.6 V and a lower-limit voltage of 2.0 V three times. The test battery was charged with a constant current and a constant voltage for 5 hours at the equivalent of 0.3 C with an upper-limit voltage of 3.6 V and was discharged with a constant current at the equivalent of 0.3 C with a lower-limit voltage of 2.0 V, and then the discharging capacity was calculated.

Then, the volume energy density (of which the unit is mAh/cc ($mAh/cm^3$)) of the electrode was calculated. The discharging capacity was divided by the mixture weight of the electrode (the total weight of the olivine positive-electrode material, the conducting agent, and the binder), and the electrode density (2.2 g/cc) was multiplied by the content (91% in terms of weight percentage) of the positive-electrode active material, which was used as the volume energy density. This value represents energy per unit volume and serves as an indicator of the state of charge of the battery.

The electrode resistance was calculated in the following order. The test battery was charged to 3.6 V and was then discharged at 0.3 C by 20% of the discharging capacity of 0.3 C, whereby the state of charge was 80%. After 2 hours passed in an idle state, the test battery was subjected to a constant-current discharging operation of 1 C for 10 seconds. After 15 minutes passed in an idle state, the test battery was charged at 0.3 C by the discharged electricity, was left in an idle state for 2 hours, and was subjected to a constant-current discharging operation of 2 C for 10 seconds. Finally, the test battery was subjected to a 3 C discharging operation in the same order and the electrode resistance at the tenth second was calculated from the relationship between the discharging current and the voltage drop.

As the evaluation results of the positive electrode, the ratio (average secondary particle diameter/average pit diameter) of the average secondary particle diameter of the olivine positive-electrode material (positive-electrode active material) and the average pit diameter, the surface roughness Ra of the carbon coating layer on the collector of an aluminum substrate, the thickness of the carbon coating layer, the weight percentage of the fibrous carbon in the conducting agent, the average secondary particle diameter, the content of the positive-electrode active material in the mixture layer, the electrode density, the electrode volume energy density, the discharging capacity (A) at a current of $0.125\ mA/cm^2$, the discharging capacity (B) at a current of $0.5\ mA/cm^2$, the discharging capacity retention ratio (B/A), and the electrode resistance are described in the row of Example 1 in Table 1. Here, the discharging capacity retention ratio was calculated by dividing the discharging capacity (B) by the discharging capacity (A). The volume energy density was 291 mAh/cc (291 $mAh/cm^3$) and the discharging capacity retention ratio was 0.98, both of which were excellent. The electrode resistance was 13Ω which was low resistance.

Figure 1B:
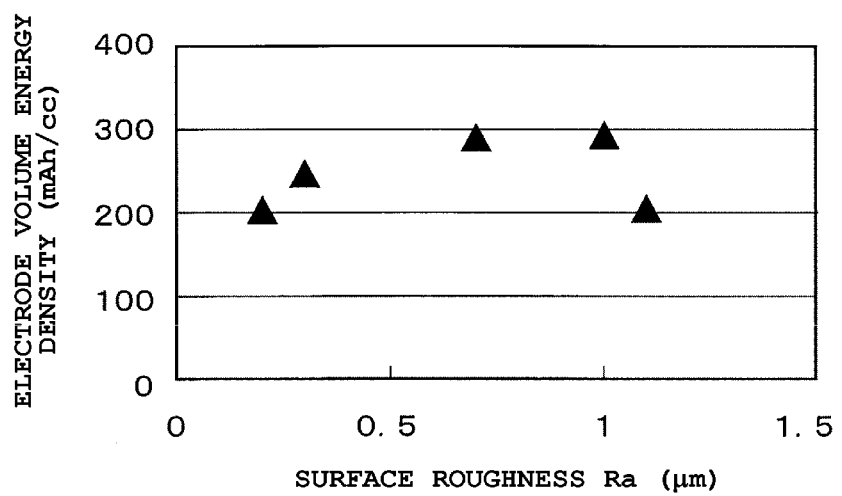

The relationship among the surface roughness Ra, the volume energy density of the electrode, and the electrode resistance is shown in FIG. 1, where the surface roughness Ra of the carbon coating layer on the aluminum collector is changed with the electrode structure according to Example 1. Until Ra reaches 1 μm, the density of the electrode increases with the increase in surface roughness Ra. However, when the surface roughness Ra is 1.1 μm, the interface between the mixture layer and the collector is locally non-uniform, the discharging characteristics are deteriorated due to the detachment, and thus the volume energy density of the electrode is lowered. On the other hand, when Ra is 0.2, the overall mixture layer is detached due to the low electrode density, the electrode density is not improved, and the volume energy density is low. The electrode resistance at that time is shown in FIG. 1. The range of Ra in which the electrode resistance is low is from 0.3 to 1.0 μm, which is matched with the above-mentioned range of the volume energy density. As described above, when the surface roughness Ra is in the range of 0.3 to 1.0 μm, both the resistivity structure of the electrode and the volume energy density are improved.

TABLE 1

| Ex. | Com. Ex. | Average secondary particle diameter of positive-electrode active material/average pit diameter | Surface roughness of carbon coating layer on collector Ra (μm) | Thickness of carbon coating layer (μm) | Wt % in fibrous carbon in conducting agent (%) | Average secondary particle diameter of positive-electrode active material (μm) | Content of positive-electrode active material (%) |
|---|---|---|---|---|---|---|---|
| 1 | | 0.2 | 0.7 | 1 | 50 | 0.8 | 91 |
| 2 | | 0.1 | 0.3 | 0.8 | 50 | 0.2 | 91 |
| 3 | | 0.2 | 1 | 1.4 | 50 | 1 | 91 |
| | 1 | 0.6 | 0.2 | 0.8 | 50 | 0.8 | 91 |
| | 2 | 0.2 | 1.1 | 1.4 | 50 | 0.8 | 91 |
| 4 | | 0.5 | 0.3 | 0.8 | 50 | 1 | 91 |
| | 3 | 0.09 | 0.7 | 1.4 | 50 | 0.48 | 91 |
| 5 | | 0.2 | 0.7 | 1 | 20 | 0.8 | 91 |
| | 4 | 0.2 | 0.7 | 1 | 10 | 0.8 | 91 |
| | 5 | — | — | 1 | 60 | — | 91 |
| 6 | | 0.2 | 0.7 | 1 | 50 | 0.8 | 90 |
| 7 | | 0.2 | 0.7 | 1 | 50 | 0.8 | 93 |
| | 6 | 0.2 | 0.7 | 1 | 50 | 0.8 | 89 |
| | 7 | 0.2 | 0.7 | 1 | 50 | 0.8 | 94 |
| | 8 | — | — | 1 | 50 | 0.1 | 91 |
| | 9 | 0.2 | 0.7 | 1 | 50 | 1.1 | 91 |
| 8 | | 0.2 | 0.7 | | 50 | 0.8 | 91 |

TABLE 1-continued

| 10 | 0.6 | 0.2 | 50 | 0.8 | 91 |
|---|---|---|---|---|---|

| Ex. | Com. Ex. | Electrode density (g/cc) | Electrode volume energy density (mAh/cc) | (1) Discharging capacity at current of 0.125 mA/cm² (mAh/g) | (2) Discharging capacity at current of 0.5 mA/cm² (mAh/g) | Discharging capacity retention ratio ((2)/(1)) | Electrode resistance (Ω) |
|---|---|---|---|---|---|---|---|
| 1 |   | 2.2 | 291 | 163 | 159 | 0.98 | 13 |
| 2 |   | 2   | 248 | 153 | 145 | 0.95 | 15 |
| 3 |   | 2.3 | 293 | 157 | 153 | 0.97 | 12 |
|   | 1 | 1.9 | 204 | 132 | 87  | 0.66 | 23 |
|   | 2 | 2.4 | 206 | 136 | 88  | 0.65 | 30 |
| 4 |   | 2.1 | 266 | 156 | 147 | 0.94 | 15 |
|   | 3 | 1.9 | 207 | 134 | 87  | 0.65 | 26 |
| 5 |   | 2.3 | 295 | 158 | 149 | 0.94 | 12 |
|   | 4 | 1.9 | 205 | 133 | 88  | 0.66 | 27 |
|   | 5 | —   | —   | —   | —   | —    | —  |
| 6 |   | 2.3 | 287 | 157 | 152 | 0.97 | 13 |
| 7 |   | 2   | 272 | 160 | 150 | 0.94 | 12 |
|   | 6 | 2.3 | 261 | 146 | 102 | 0.70 | 26 |
|   | 7 | 1.9 | 219 | 133 | 85  | 0.64 | 27 |
|   | 8 | —   | —   | —   | —   | —    | —  |
|   | 9 | 1.9 | 207 | 134 | 88  | 0.66 | 27 |
| 8 |   | 2   | 249 | 153 | 146 | 0.95 | 17 |
|   | 10 | 1.7 | 218 | 134 | 88  | 0.66 | 41 |

Evaluation of Cylindrical Rechargeable Lithium Ion Battery

In order to prepare a cylindrical rechargeable lithium ion battery which is a test battery, a positive electrode plate formed of Olivine Positive-electrode Material 1 was cut with a coating width of 5.4 cm and a coating length of 60 cm. In order to extract a current, a lead piece formed of an aluminum foil was welded to the positive electrode plate.

Then, in order to prepare a cylindrical rechargeable lithium ion battery in combination with the positive electrode plate, a negative electrode plate was manufactured. A graphite carbon material as a negative-electrode active material was dissolved in an NMP as a binder and the resultant was mixed, whereby a negative-electrode mixture slurry was prepared. At this time, the dry weight ratio of the graphite carbon material and the binder was set to 92:8. This slurry was uniformly applied onto a rolled copper foil with a thickness of 10 μm. Thereafter, the resultant was pressed by the use of a roll pressing machine, the resultant was cut with a coating width of 5.6 cm and a coating length of 64 cm, and a lead piece formed of a copper foil was welded thereto, whereby a negative electrode plate was manufactured.

Figure 2:
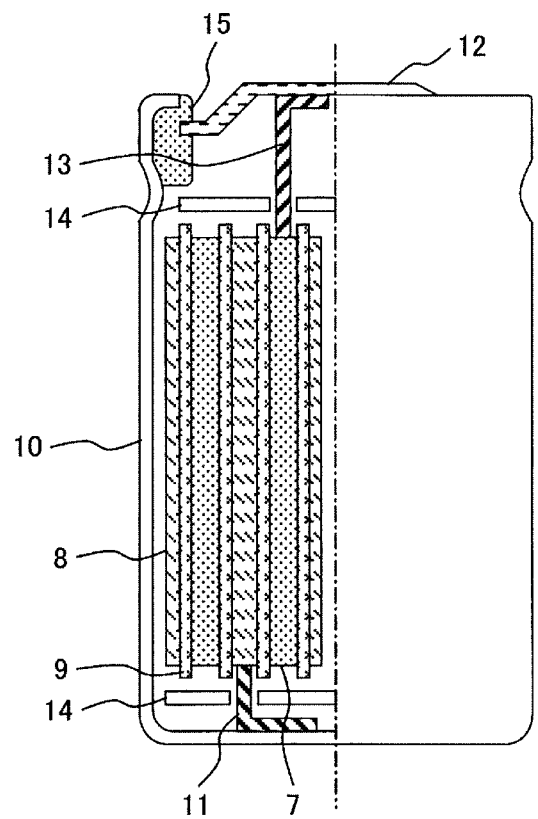
FIG. 2 is an exploded cross-sectional view schematically illustrating a cylindrical rechargeable lithium ion battery.

FIG. 2 is an partially-exploded cross-sectional view schematically illustrating the manufactured cylindrical rechargeable lithium ion battery. The cylindrical rechargeable lithium ion battery was manufactured in the following order using the positive electrode plate and the negative electrode plate manufactured as described above.

First, a separator 9 was disposed between the positive electrode plate 7 and the negative electrode plate 8 so as not to bring the positive electrode plate 7 and the negative electrode plate 8 into direct contact with each other, and the resultant was wound to form an electrode group. At this time, a lead piece (positive-electrode lead piece) 13 of the positive electrode plate 7 and a lead piece (negative-electrode lead piece) 11 of the negative electrode plate 8 were positioned at both opposite end faces of the electrode group. The positive electrode plate 7 and the negative electrode plate 8 were disposed so that mixture-applied portion of the positive electrode does not protrude from the mixture-applied portion of the negative electrode. The separator 9 used herein was a micro-porous polypropylene film with a thickness of 25 μm and a width of 5.8 cm.

The electrode group was inserted into a battery can 10 formed of SUS, the negative-electrode lead piece 11 was welded to the bottom of the battery can, and the positive-electrode lead piece 13 was welded to a sealing lid 12. The sealing lid 12 also serves as a positive-electrode current terminal. A non-aqueous electrolytic solution was injected into the battery can 10 in which the electrode group was disposed. As the non-aqueous electrolytic solution, a solution in which 1.0 mol/liter of $LiPF_6$ was dissolved in a mixed solvent of ethylene carbonate (EC) and dimethyl carbonate (DMC) at a volume ratio of 1:2 was used. Thereafter, the battery can 10 was caulked and sealed with the sealing lid 12 having a packing 15 mounted thereon, whereby a cylindrical battery with a diameter of 18 mm and a length 65 mm.

A cleavage valve which is cleaved to lower the pressure in the battery when the pressure in the battery is raised was disposed in the sealing lid 12. An insulating plate 14 was disposed between the sealing lid 12 and the electrode group and between the bottom of the battery can 10 and the electrode group.

This cylindrical battery was initialized by repeating a charging and discharging operation at 0.3 C with an upper-limit voltage 3.6 V and a lower-limit voltage 2.0 V three times. The cylindrical battery was subjected to a charging and discharging operation of 0.3 C with an upper-limit voltage of 3.6 V and a lower-limit voltage of 2.0 V and then the battery discharging capacity was measured. The battery discharging capacity was 1.3 Ah.

As described above, in the cylindrical rechargeable lithium ion battery using the positive electrode according to this example, it is possible to enhance the capacity.

A battery module was prepared in which 8 cylindrical rechargeable lithium ion batteries were connected in series to raise the capacity.

Example 2

Similarly to Example 1, except that the surface roughness Ra of the carbon coating layer on the aluminum collector in Example 1 was changed to 0.3 μm, the thickness of the carbon coating layer was changed to 0.8 μm, and the average secondary particle diameter of the olivine positive-electrode material was changed to 0.2 μm, a positive electrode was manufactured and a battery employing the positive electrode was evaluated. In Example 2, the ratio of the average secondary particle diameter of the olivine positive-electrode material and the average pit diameter (average secondary particle diameter/average pit diameter) was set to 0.1.

Since the surface roughness Ra was set to 0.3 μm, the electrode density was slightly lowered to 2.0 g/cc (g/cm$^3$). The evaluated volume energy density of the electrode was 248 mAh/cc (mAh/cm$^3$) and the discharging capacity retention ratio was 0.95. The electrode resistance was 15Ω which was low. The results are described in the row of Example 2 in Table 1.

Example 3

Similarly to Example 1, except that the surface roughness Ra of the carbon coating layer on the aluminum collector in Example 1 was changed to 1 μm, the thickness of the carbon coating layer was changed to 1.4 μm, and the average secondary particle diameter of the olivine positive-electrode material was changed to 1 μm, a positive electrode was manufactured and a battery employing the positive electrode was evaluated. In Example 3, the ratio of the average secondary particle diameter of the olivine positive-electrode material and the average pit diameter (average secondary particle diameter/average pit diameter) was set to 0.2.

Since the surface roughness Ra was set to 1 μm, the electrode density was slightly raised to 2.3 g/cc. The evaluated volume energy density of the electrode was 293 mAh/cc and the discharging capacity retention ratio was 0.97. The electrode resistance was 12Ω which was low. The results are described in the row of Example 3 in Table 1.

Comparative Example 1

Similarly to Example 1, except that the surface roughness Ra of the carbon coating layer on the aluminum collector in Example 1 was changed to 0.2 μm and the thickness of the carbon coating layer was changed to 0.8 μm, a positive electrode was manufactured and a battery employing the positive electrode was evaluated. In Comparative Example 1, the ratio of the average secondary particle diameter of the olivine positive-electrode material and the average pit diameter (average secondary particle diameter/average pit diameter) was set to 0.6.

Since the surface roughness Ra was set to 0.2 μm, the electrode density was lowered to 1.9 g/cc. The evaluated volume energy density of the electrode was 204 mAh/cc and the discharging capacity retention ratio was 0.66, whereby the battery characteristics were deteriorated. The electrode resistance was raised to 23Ω. The results are described in the row of Comparative Example 1 in Table 1.

Comparative Example 2

Similarly to Example 1, except that the surface roughness Ra of the carbon coating layer on the aluminum collector in Example 1 was changed to 1.1 μm and the thickness of the carbon coating layer was changed to 1.4 μm, a positive electrode was manufactured and a battery employing the positive electrode was evaluated. In Comparative Example 2, the ratio of the average secondary particle diameter of the olivine positive-electrode material and the average pit diameter (average secondary particle diameter/average pit diameter) was set to 0.2.

Since the surface roughness Ra was set to 1.1 μm, the electrode density was raised to 2.4 g/cc. Here, the electrode was locally broken at the time of processing the electrode. Accordingly, the evaluated volume energy density of the electrode was 206 mAh/cc and the discharging capacity retention ratio was 0.65, whereby the battery characteristics were deteriorated. The electrode resistance was raised to 30Ω. The results are described in the row of Comparative Example 2 in Table 1.

Example 4

Similarly to Example 1, except that the surface roughness Ra of the carbon coating layer on the aluminum collector in Example 1 was changed to 0.3 μm, the thickness of the carbon coating layer was changed to 0.8 μm, and the average secondary particle diameter of the olivine positive-electrode material was changed to 1 μm, a positive electrode was manufactured and a battery employing the positive electrode was evaluated. In Example 4, the ratio of the average secondary particle diameter of the olivine positive-electrode material and the average pit diameter (average secondary particle diameter/average pit diameter) was set to 0.5.

Since the surface roughness Ra was set to 0.3 μm, the electrode density was slightly lowered to 2.1 g/cc. The evaluated volume energy density of the electrode was 266 mAh/cc and the discharging capacity retention ratio was 0.94. The electrode resistance was 15Ω which was low. The results are described in the row of Example 4 in Table 1.

Comparative Example 3

Similarly to Example 1, except that the average secondary particle diameter of the olivine positive-electrode material was changed to 0.48 μm, a positive electrode was manufactured and a battery employing the positive electrode was evaluated. In Comparative Example 3, the ratio of the average secondary particle diameter of the olivine positive-electrode material and the average pit diameter (average secondary particle diameter/average pit diameter) was set to 0.09.

Since the ratio of the average secondary particle diameter and the average pit diameter was lowered, the anchor effect was reduced and the electrode density was lowered to 1.9 g/cc. The evaluated volume energy density of the electrode was 207 mAh/cc and the discharging capacity retention ratio was 0.65. The electrode resistance was raised to 26Ω. The results are described in the row of Comparative Example 3 in Table 1.

Example 5

Similarly to Example 1, except that the weight percentage of the fibrous carbon in the conducting agent was changed to 20%, a positive electrode was manufactured and a battery employing the positive electrode was evaluated.

Since acetylene black has a volume density higher than VGCF which is the fibrous carbon, the electrode density was slightly raised to 2.3 g/cc. The evaluated volume energy density of the electrode was 295 mAh/cc and the discharging capacity retention ratio was 0.94. Since the amount of fibrous carbon added was lowered, the discharging capacity retention ratio was slightly lowered. The electrode resistance was 12Ω which was low. The results are described in the row of Example 5 in Table 1.

Comparative Example 4

Similarly to Example 1, except that the weight percentage of the fibrous carbon in the conducting agent was changed to 10%, a positive electrode was manufactured and a battery employing the positive electrode was evaluated.

Since the amount of fibrous carbon was small, the anchor effect was reduced and the electrode density was lowered to 1.9 g/cc. The evaluated volume energy density of the electrode was 205 mAh/cc and the discharging capacity retention ratio was 0.66. Since the amount of fibrous carbon added was lowered, the discharging capacity retention ratio was slightly lowered. The electrode resistance was raised to 27Ω. The results are described in the row of Comparative Example 4 in Table 1.

Comparative Example 5

Similarly to Example 1, except that the weight percentage of the fibrous carbon in the conducting agent was changed to 60%, a positive electrode was manufactured.

Since the amount of fibrous carbon was great, a lot of aggregates were generated in the slurry and thus a positive electrode could not be formed. The results are described in the row of Comparative Example 5 in Table 1.

Example 6

Similarly to Example 1, except that the content of the olivine positive-electrode material was changed to 90%, a positive electrode was manufactured and a battery employing the positive electrode was evaluated.

Since the content of the olivine positive-electrode material was lowered, the electrode density was slightly raised to 2.3 g/cc. The evaluated volume energy density of the electrode was 287 mAh/cc and the discharging capacity retention ratio was 0.97. The electrode resistance was 13Ω which was low. The results are described in the row of Example 6 in Table 1.

Example 7

Similarly to Example 1, except that the content of the olivine positive-electrode material was changed to 93%, a positive electrode was manufactured and a battery employing the positive electrode was evaluated.

Since the content of the olivine positive-electrode material was raised, the electrode density was slightly lowered to 2 g/cc. The evaluated volume energy density of the electrode was 272 mAh/cc and the discharging capacity retention ratio was 0.94. The electrode resistance was 12Ω which was low. The results are described in the row of Example 7 in Table 1.

Comparative Example 6

Similarly to Example 1, except that the content of the olivine positive-electrode material was changed to 89%, a positive electrode was manufactured and a battery employing the positive electrode was evaluated.

Since the content of the olivine positive-electrode material was lowered, the electrode density was slightly raised to 2.3 g/cc. The evaluated volume energy density of the electrode was 261 mAh/cc and the discharging capacity retention ratio was 0.70. Since the content of the olivine positive-electrode material was low, a desired high volume energy density could not be achieved. The electrode resistance was raised to 26Ω. The results are described in the row of Comparative Example 6 in Table 1.

Comparative Example 7

Similarly to Example 1, except that the content of the olivine positive-electrode material was changed to 94%, a positive electrode was manufactured and a battery employing the positive electrode was evaluated.

Since the content of the olivine positive-electrode material was raised, the electrode density was lowered to 1.9 g/cc due to the detachment. The evaluated volume energy density of the electrode was 219 mAh/cc and the discharging capacity retention ratio was 0.64. The electrode resistance was raised to 27Ω. The results are described in the row of Comparative Example 7 in Table 1.

Comparative Example 8

Similarly to Example 1, except that the average secondary particle diameter of the olivine positive-electrode material was changed to 0.1 μm, a positive electrode was manufactured.

Since a lot of aggregates were generated in the slurry, a positive electrode could not be formed. The results are described in the row of Comparative Example 8 in Table 1.

Comparative Example 9

Similarly to Example 1, except that the average secondary particle diameter of the olivine positive-electrode material was changed to 1.1 μm and the ratio of the average secondary particle diameter and the average pit diameter was changed to 0.2, a positive electrode was manufactured and a battery employing the positive electrode was evaluated. Since the average secondary particle diameter was increased, the ratio of the average secondary particle diameter and the average pit diameter was slightly increased.

Since the average secondary particle diameter of the olivine positive-electrode material was increased, the electrode density was lowered to 1.9 g/cc. The evaluated volume energy density of the electrode was 207 mAh/cc and the discharging capacity retention ratio was 0.66. The electrode resistance was raised to 27Ω. The results are described in the row of Comparative Example 9 in Table 1.

Example 8

In Example 8, an olivine positive-electrode material expressed by a composition expression $LiMn_{0.8}Fe_{0.2}PO_4$ was prepared instead of the olivine positive-electrode material $LiFePO_4$ prepared in Example 1. The preparation method will be described below.

7.2 g of $NH_4H_2PO_4$, 2.27 g of $LiOH.H_2O$, 9 g of $MnC_2O_4.2H_2O$, and 2.25 g of $FeC_2O_4.2H_2O$ were mixed. Sucrose was added thereto by 12 wt %, zirconia pulverizing balls were input to a zirconia pot, and the resultant was mixed through the use of a planetary ball mill. The mixed powder was input to an alumina crucible and was temporarily fired at 400° C. under the flow of argon of 0.3 L/min for 10 hours.

The temporarily burned material was crushed with an agate mortar, the resultant was input again to the alumina crucible, and was mainly fired at 700° C. under the flow of argon of 0.3 L/min for 10 hours. After the main firing, the resultant powder was crushed with an agate mortar and the grain size was adjusted with a sieve of 40 μm meshes, whereby an olivine positive-electrode material expressed by a composition expression $LiMn_{0.8}Fe_{0.2}PO_4$ was obtained.

A positive electrode was manufactured and evaluated similarly to Example 1. Since $LiMn_{0.8}Fe_{0.2}PO_4$ had a true density lower than that of $LiFePO_4$, the electrode density was 2 g/cc.

Similarly to Example 1, a cylindrical rechargeable lithium ion battery which was a test battery was manufactured and was evaluated. Here, in the evaluation of the battery, the charging voltage was set to 4.1 V. The evaluated volume energy density of the electrode was 257 mAh/cc and the discharging capacity retention ratio was 0.95. The electrode resistance was 17Ω which was low. The results are described in the row of Example 8 in Table 1.

Comparative Example 10

Similarly to Example 1, except that the surface roughness Ra of the carbon coating layer on the aluminum collector in Example 8 was changed to 0.2 μm and the thickness of the carbon coating layer was changed to 0.8 μm, a positive electrode was manufactured and a battery employing the positive electrode was evaluated. In Comparative Example 10, the ratio of the average secondary particle diameter of the olivine positive-electrode material and the average pit diameter (average secondary particle diameter/average pit diameter) was set to 0.6.

Since the surface roughness Ra was set to 0.2 μm, the electrode density was lowered to 1.7 g/cc. The evaluated volume energy density of the electrode was 218 mAh/cc and the discharging capacity retention ratio was 0.66. The electrode resistance was raised to 41Ω. The results are described in the row of Comparative Example 10 in Table 1.

The invention can be used for apparatuses such as electric vehicles or plug-in hybrid vehicles requiring high capacity.

What is claimed is:

1. A positive electrode for a rechargeable lithium ion battery comprising:
    a mixture layer that includes a positive-electrode active material, a conducting agent, and a binder; and
    a collector that has the mixture layer formed on the surface thereof,
    wherein the positive-electrode active material is a composite oxide having an olivine structure expressed by a formula $Li_aM_xPO_4$ (where M represents a transition metal including at least one of Fe and Mn and a and x satisfy $0<a\leq1.1$ and $0.9\leq x\leq1.1$),
    wherein the conducting agent includes fibrous carbon,
    wherein a carbon coating layer is formed on the surface of the collector,
    wherein a part of the positive-electrode active material and a part of the fibrous carbon enter pits formed in the carbon coating layer, and
    wherein an average secondary particle diameter/average pit diameter ratio which is a ratio of the average secondary particle diameter and the average pit diameter of the pits is in the range of 0.1 to 0.5.

2. The positive electrode for a rechargeable lithium ion battery according to claim 1, wherein the positive-electrode active material has an average secondary particle diameter of 0.2 μm to 1 μm.

3. The positive electrode for a rechargeable lithium ion battery according to claim 1, wherein the surface roughness of the carbon coating layer is in the range of 0.3 μm to 1 μm.

4. The positive electrode for a rechargeable lithium ion battery according to claim 1, wherein the thickness of the carbon coating layer is in the range of 0.8 μm to 1.4 μm.

5. The positive electrode for a rechargeable lithium ion battery according to claim 1, wherein the weight percentage of the fibrous carbon in the conducting agent is equal to or greater than 20% and less than 60%.

6. The positive electrode for a rechargeable lithium ion battery according to claim 1, wherein the content of the positive-electrode active material in the mixture layer is in the range of 90% to 93% in terms of the weight percentage.

7. The positive electrode for a rechargeable lithium ion battery according to claim 1, wherein the electrode density is in the range of 2.0 g/cc to 2.3 g/cc.

8. A rechargeable lithium ion battery comprising the positive electrode for a rechargeable lithium ion battery according to claim 1.

9. A battery module in which a plurality of the rechargeable lithium ion batteries according to claim 8 are electrically connected.

* * * * *